US012122558B2

(12) United States Patent
Kisch

(10) Patent No.: US 12,122,558 B2
(45) **Date of Patent: *Oct. 22, 2024**

(54) HAND-HELD VESSEL

(71) Applicant: Bercom International, LLC, Chanhassen, MN (US)

(72) Inventor: Steven Nicholas Kisch, Zimmerman, MN (US)

(73) Assignee: Bercom International, LLC, Chanhassen, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,090

(22) Filed: Apr. 18, 2023

(65) Prior Publication Data

US 2023/0249877 A1 Aug. 10, 2023

Related U.S. Application Data

(63) Continuation of application No. 17/479,085, filed on Sep. 20, 2021, now Pat. No. 11,661,239.

(60) Provisional application No. 63/082,612, filed on Sep. 24, 2020.

(51) Int. Cl.
*B65D 25/28* (2006.01)
*B44D 3/12* (2006.01)

(52) U.S. Cl.
CPC ......... *B65D 25/2829* (2013.01); *B44D 3/121* (2013.01)

(58) Field of Classification Search
CPC ............ B65D 25/2829; B65D 25/2832; B65D 25/282; B65D 25/2888
USPC ........................................ 220/759, 505, 775
See application file for complete search history.

(56) References Cited

U.S. PATENT DOCUMENTS

| | | | | |
|---|---|---|---|---|
| 3,317,232 A * | 5/1967 | McFaul | B65D 25/2829 | D7/394 |
| 7,191,913 B2 | 3/2007 | Byrne | | |
| D744,186 S | 11/2015 | Gringer et al. | | |
| 9,545,815 B2 | 1/2017 | Kiceniuk | | |
| D794,892 S | 8/2017 | Bergman et al. | | |
| 10,266,000 B2 * | 4/2019 | Fee | B65D 25/2897 | |
| 11,565,544 B2 | 1/2023 | Lambertson, Jr. et al. | | |
| 11,661,239 B2 * | 5/2023 | Kisch | B65D 25/2829 | 220/754 |
| 2006/0081637 A1 * | 4/2006 | Lundy | B44D 3/121 | 220/505 |
| 2006/0243732 A1 | 11/2006 | Bergman | | |
| 2006/0288777 A1 * | 12/2006 | Lazaris | A47J 31/4457 | 73/313 |
| 2014/0299618 A1 * | 10/2014 | De Lucia | B29C 65/601 | 156/196 |

* cited by examiner

*Primary Examiner* — Stephen J Castellano
(74) *Attorney, Agent, or Firm* — Mai D. Lauer; Westman, Champlin & Koehler P.A.

(57) ABSTRACT

In one aspect, a vessel system includes a vessel and a strap. The vessel has an outside surface and includes a bottom wall; a sidewall extending from the bottom wall; and an inner wall connected to the sidewall inward of the outside surface, wherein a recess is defined between the sidewall and inner wall. The strap has opposed first and second ends, wherein the first end is received in the recess, and wherein the second end is configured for selective attachment to the outside surface.

18 Claims, 16 Drawing Sheets

HAND-HELD VESSEL

CROSS REFERENCE TO RELATED APPLICATION

This application is a continuation of U.S. patent application Ser. No. 17/479,085 for "Hand-held Vessel," filed on Sep. 20, 2021, now U.S. Pat. No. 11,661,239, which claims the benefit of priority from U.S. Provisional Patent Application No. 63/082,612 filed on Sep. 24, 2020. These priority applications are hereby incorporated by reference in their entirety.

BACKGROUND

This disclosure relates to holding vessels and more particularly to a hand-held container with a supportive strap adaptable to engage a user's hand to the container. Hand-held vessels, containers, or trays are utilized for carrying a variety of materials or fluids. Typically, a handle is provided, which allows a user to carry or hold the container without the user contacting the fluid therein. A portable, hand-held container is useful in many commercial or household applications and is especially useful in painting applications.

SUMMARY

In one aspect, a vessel system comprises a vessel and a strap. The vessel has an outside surface and comprises a bottom wall; a sidewall extending from the bottom wall; and an inner wall connected to the sidewall inward of the outside surface, wherein a recess is defined between the sidewall and inner wall. The strap has opposed first and second ends, wherein the first end is received in the recess, and wherein the second end is configured for selective attachment to the outside surface.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

Figure 1:
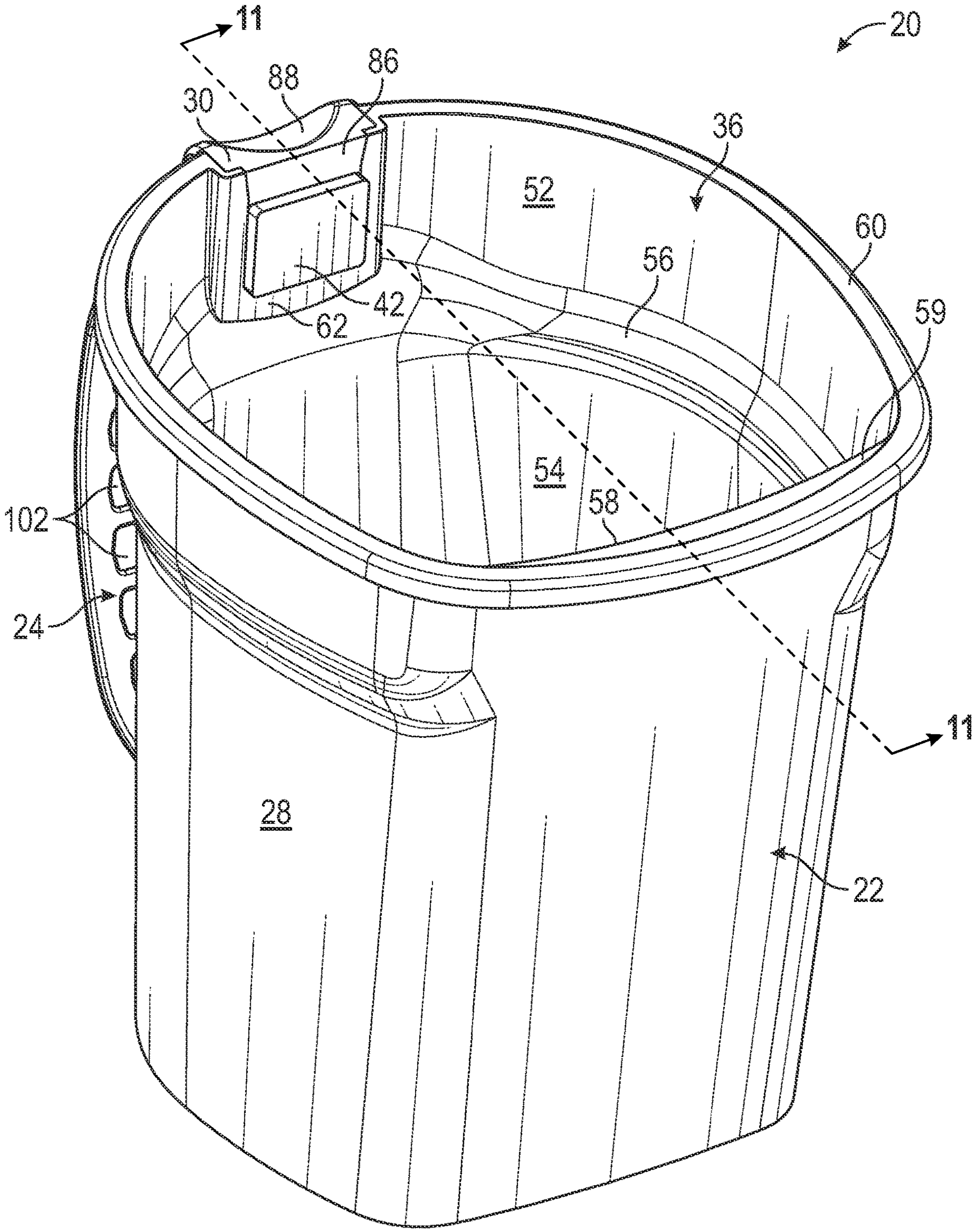
FIG. 1 is a front perspective view of an exemplary embodiment of a hand-held vessel system.
Figure 2:
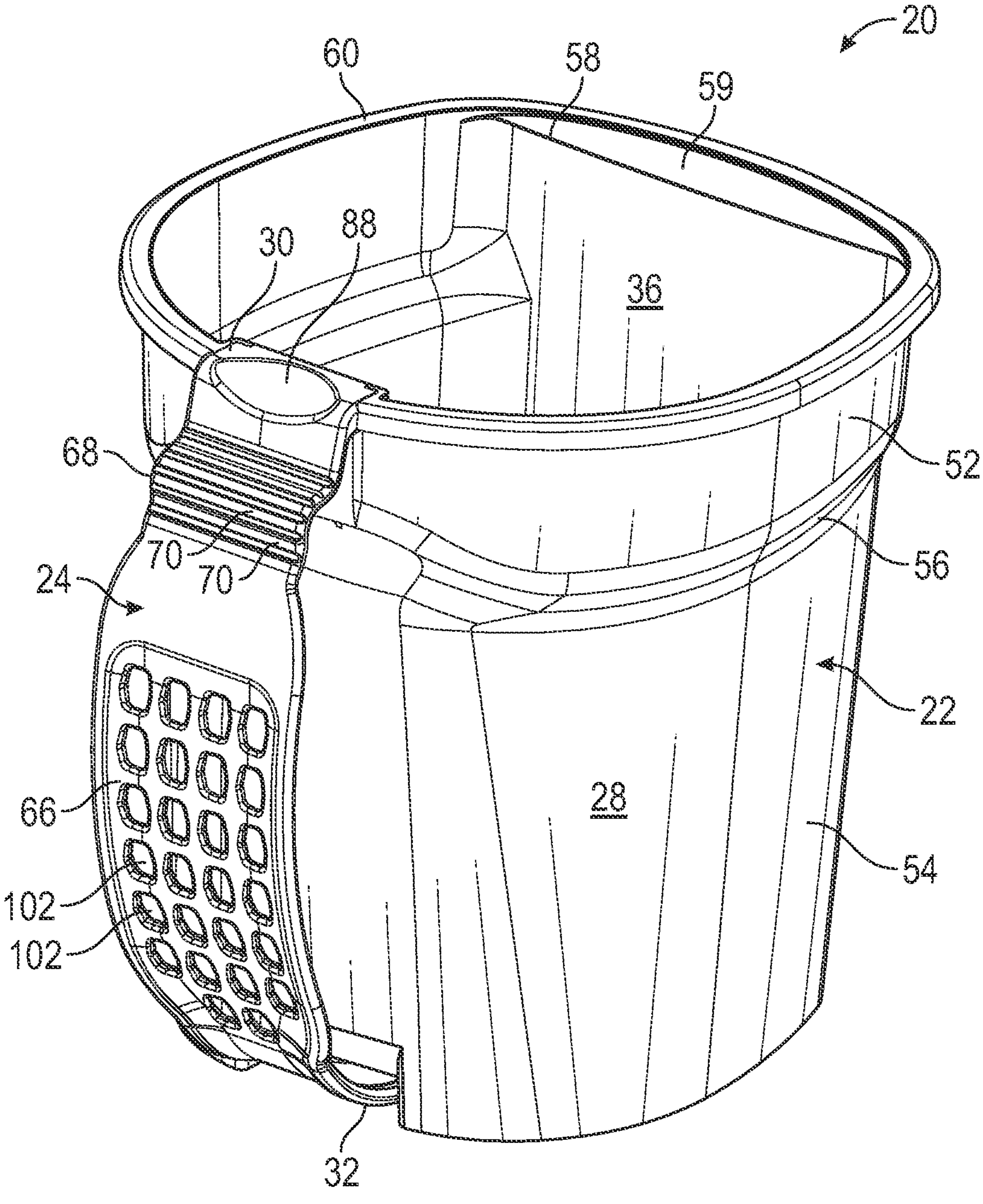
FIG. 2 is a rear perspective view of the exemplary vessel system.
Figure 3:
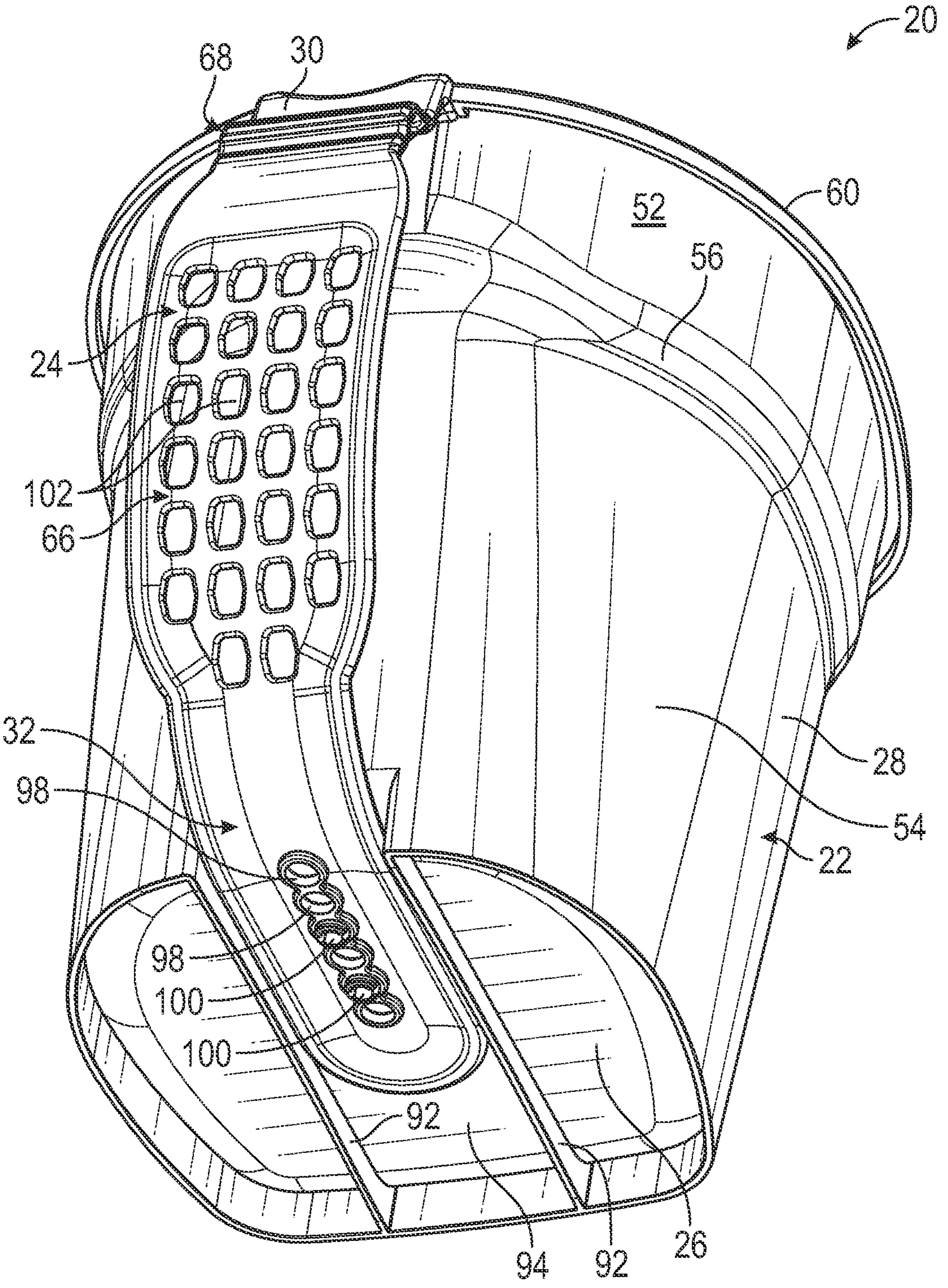
FIG. 3 is a rear bottom perspective view of the exemplary vessel system.

FIG. 1 is a front perspective view of an exemplary embodiment of a vessel system 20. FIG. 2 is a rear perspective view of the exemplary vessel system 20. FIG. 3 is a rear bottom perspective view of the exemplary vessel system 20. In an exemplary embodiment, vessel system 20 includes vessel 22 and strap 24. In some cases, this disclosure refers to a hand-held vessel system, a hand-held vessel, and a hand strap. However, these descriptions of suitable uses are not intended to limit the structures to the uses described. It is contemplated that the system, vessel and strap can be supported by structures other than a user's hand, such as a ladder rung, scaffold bar, or other support, for example.

Figure 9A:
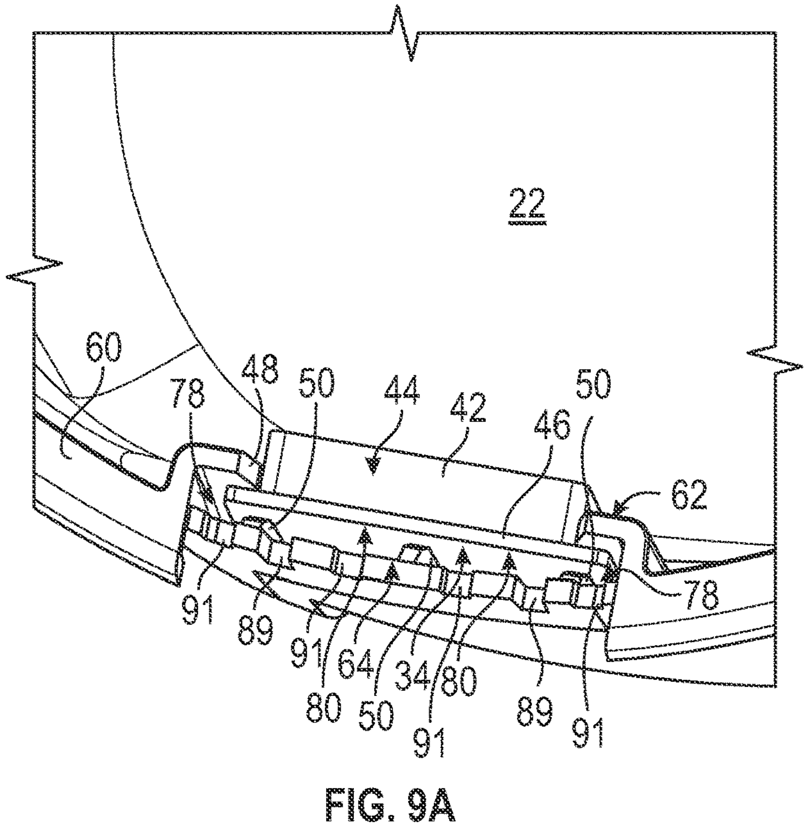
FIG. 9A is a partial enlarged view of the exemplary recess including an inserted retainer assembly.
Figure 9B:
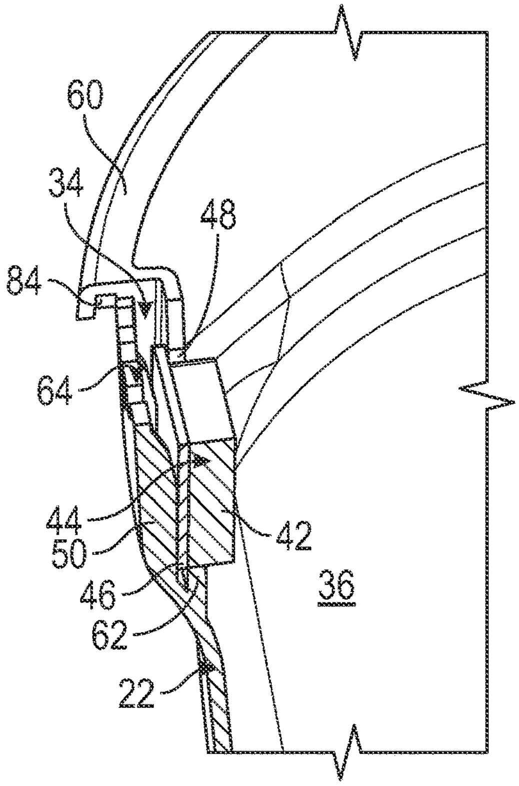
FIG. 9B is similar to FIG. 8B but shows the exemplary recess with an inserted retainer assembly.
Figure 10A:
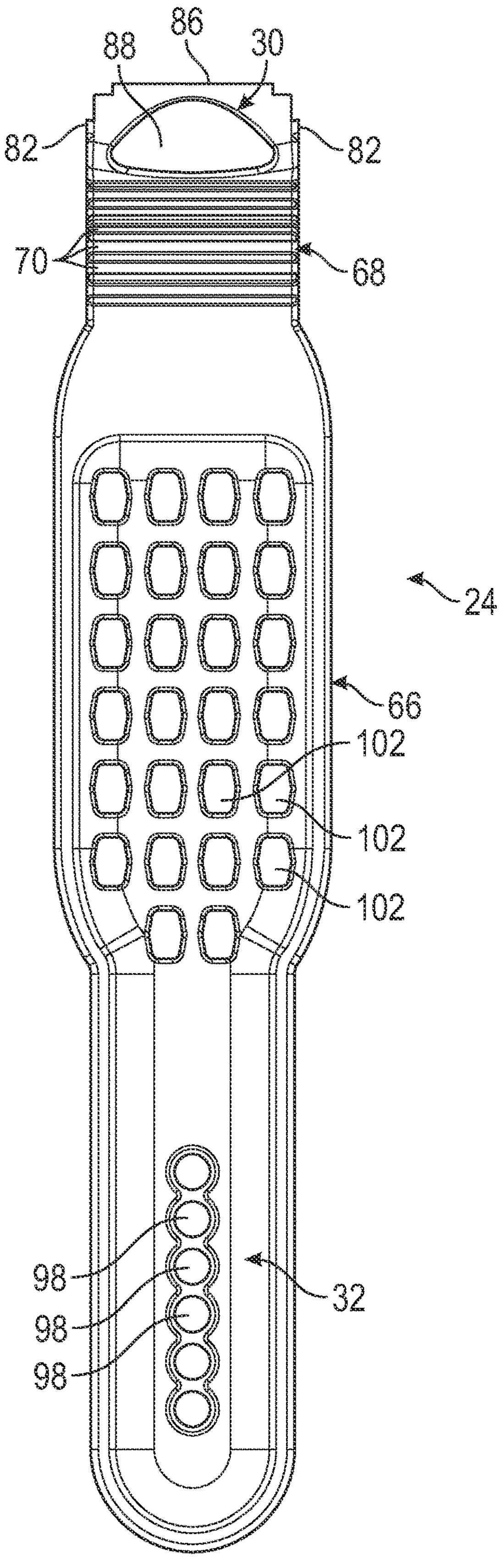
FIG. 10A is a plan view of an exemplary hand strap.
Figure 10B:
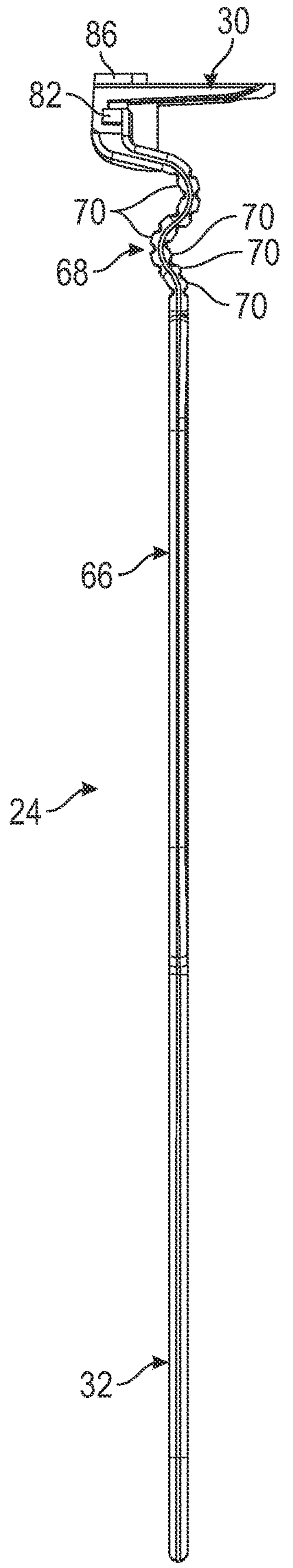
FIG. 10B is a side elevation view of the exemplary hand strap.
Figure 10C:
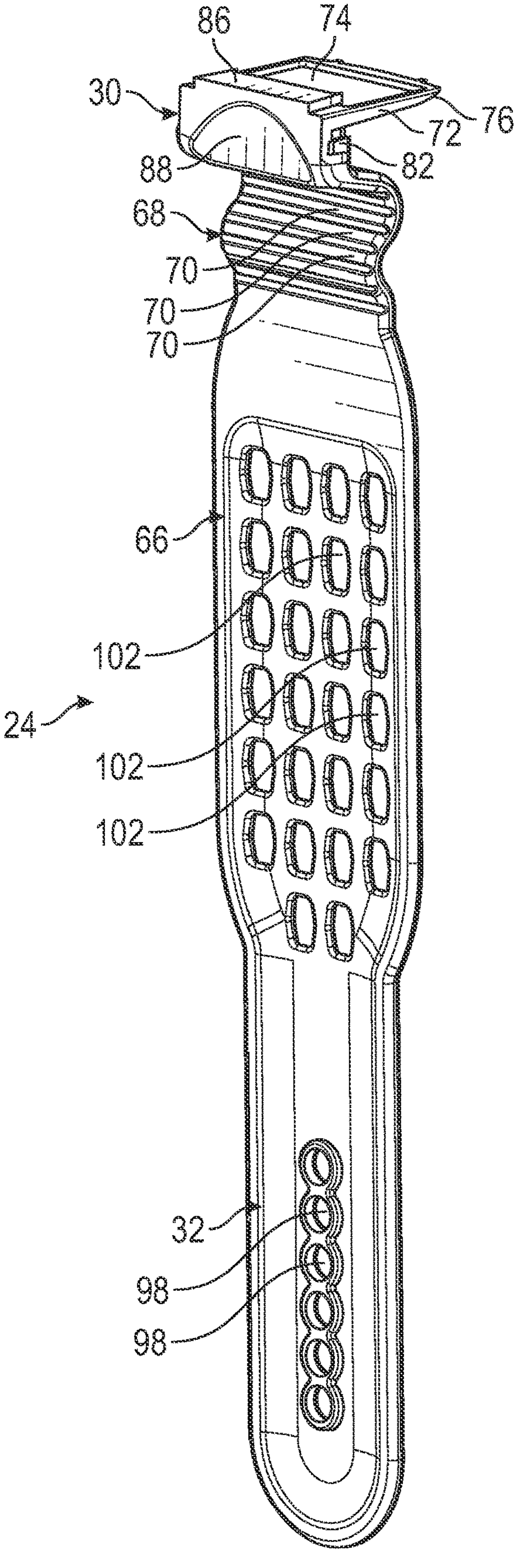
FIG. 10C is a perspective view of the exemplary hand strap.
Figure 10D:
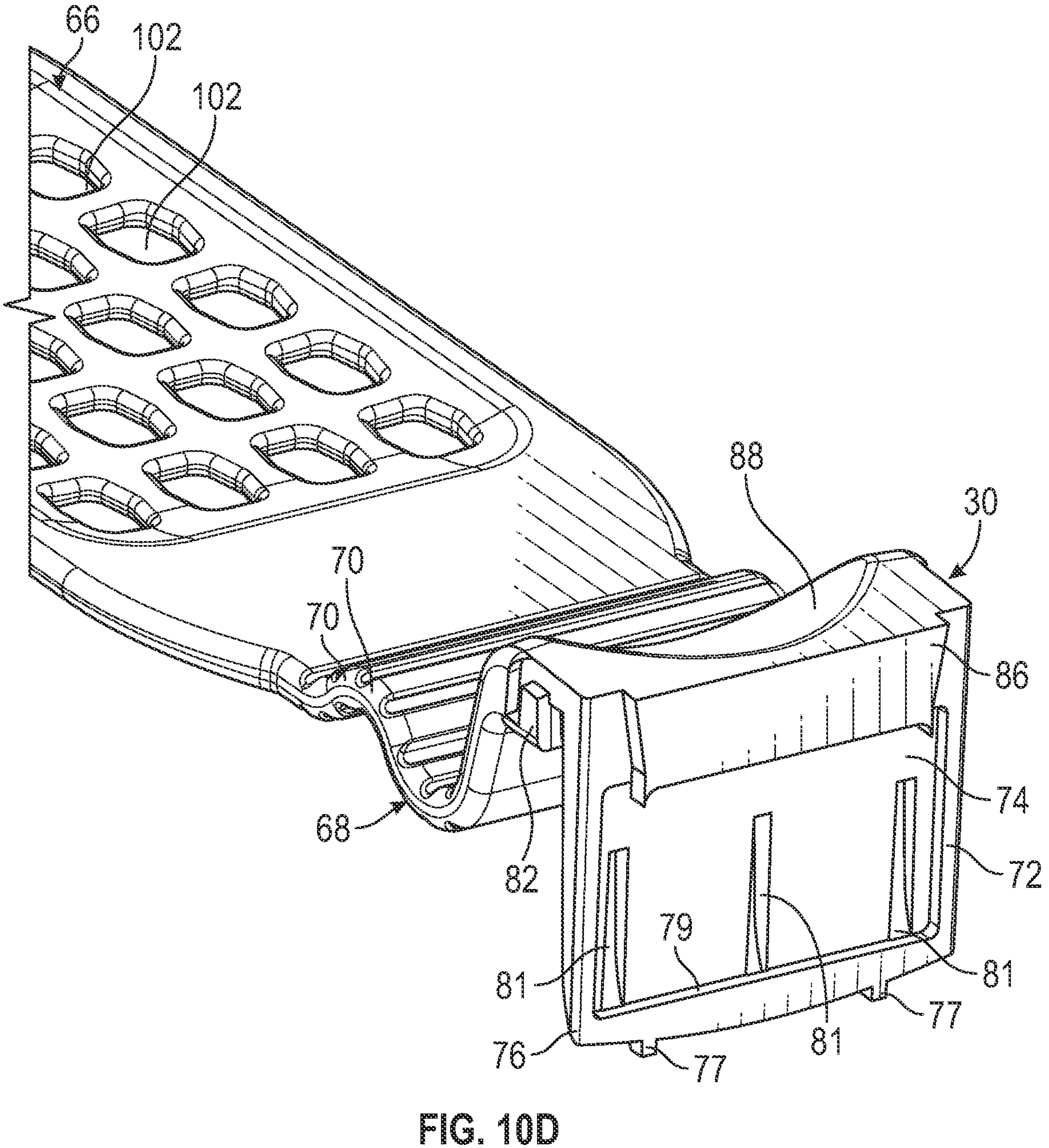
FIG. 10D is a partial top perspective view of the exemplary hand strap showing a front of the clip.

In an exemplary embodiment, vessel 22 includes a bottom wall 26 connected to sidewall 28. In an exemplary embodiment of system 20, strap 24 is manufactured separately from vessel 22 and is attachable thereto. In an exemplary embodiment, vessel 22 is made of polypropylene (or other suitable plastic) to withstand the harmful effects of paint, stain or varnish. In an exemplary embodiment, strap 22 is made of an elastomer, rubber, or other flexible, yet durable material. As shown in FIGS. 10A-10C, an exemplary strap 24 includes clip 30 at a first end, intermediate portion 66, and lower vessel connection portion 32 at a second end. Clip 30 is configured for insertion into recess 34 of vessel 22 (labeled in FIGS. 7-9B). Lower vessel connection portion 32 is configured for attachment to an exterior portion of vessel 22, such as on or near bottom wall 26 and/or sidewall 28. In an embodiment of system 20, vessel 22 is integrally formed as a single piece, and strap 24 is separately formed as a single piece.

Strap 24 is adaptable to accept a user's hand, wrist, arm, or another appendage or object disposed between strap 24 and an outer surface of sidewall 28, as described in the following U.S. patents, which are hereby incorporated by reference: U.S. Pat. Nos. 6,708,838; 6,991,829; 7,644,835; 8,550,285; 8,556,116; 8,919,604; 9,409,200; and 10,266,306. In an exemplary method of use, strap 24 secures vessel 22 to the user's hand and stabilizes vessel 22 with respect to movement relative to the hand. In an exemplary embodiment, after clip 30 of strap 24 is inserted into recess 34 of vessel 22, the clip 30 is not easily removable therefrom. Accordingly, after assembly of system 20, the vessel 22 and strap 24 are fixedly held together by mutual mechanical engagement of structures of clip 30 and recess 34. In one process of assembly of system 20, clip 30 of strap 24 is overmolded into recess 34 and onto vessel 22 so that chemical bonding, as well as mechanical engagement, hold the components of system 20 together at clip 30 and recess 34. In contrast, lower vessel connection portion 32 of strap 24 is removably attachable to vessel 22 (not overmolded onto bottom wall 26 of vessel 22), such as at bottom wall 26, to allow for adjustability in an effective length of strap 24 between its attachment points to vessel 22. This adjustability therefore affects the size of a passage 40 formed between the strap 24 and the outer surface of vessel 22 (labeled in FIG. 6).

Figure 11:
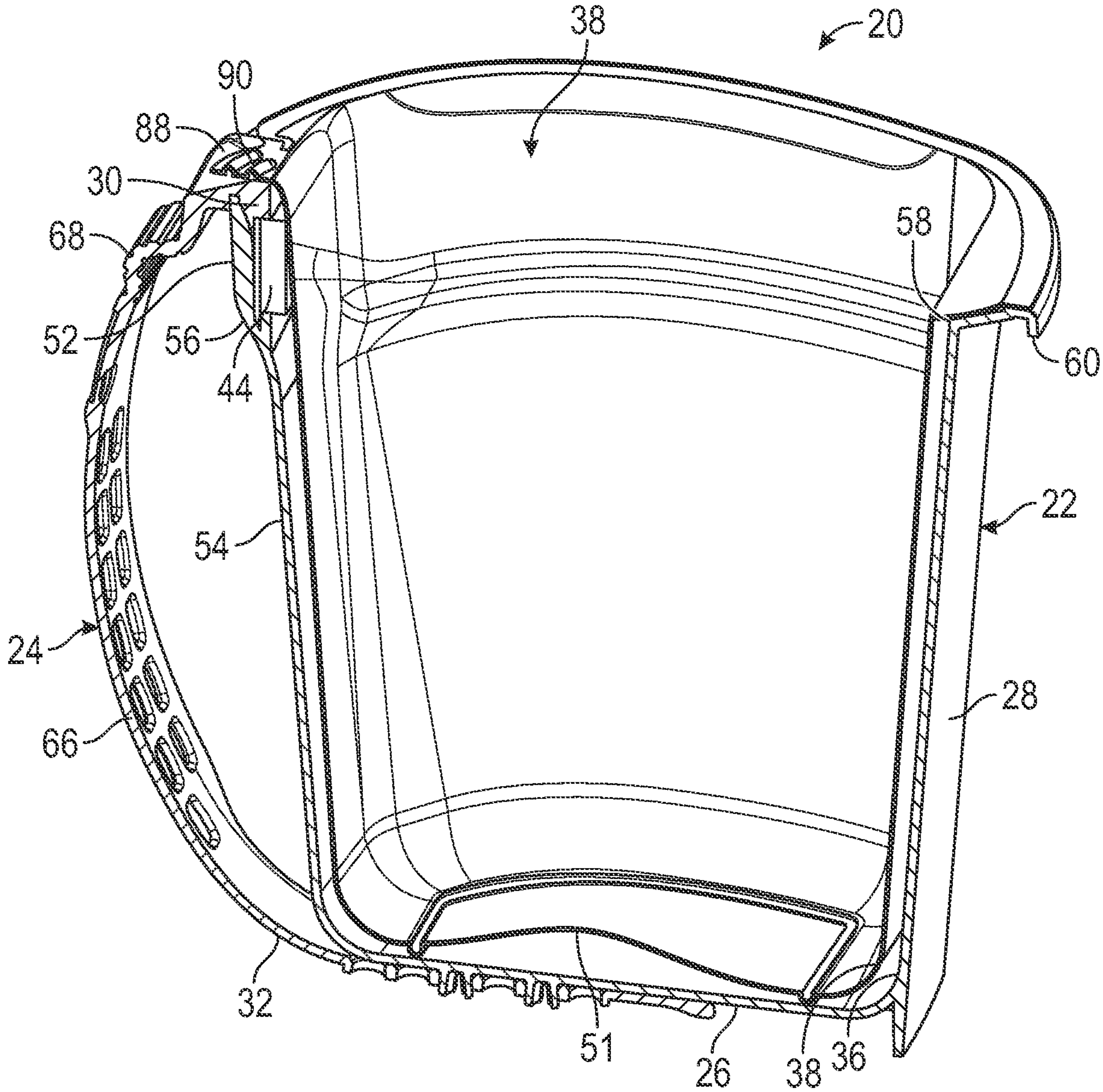
FIG. 11 is a cross-sectional view of the exemplary vessel system, taken along line 11-11 of FIG. 1, and including an inserted optional liner.

In an exemplary embodiment, vessel 22 has a continuous and smooth inner surface 36 that includes inner surfaces of bottom wall 26 and sidewall 28 and defines a cavity of vessel 22 for carrying, holding or transporting loose materials or fluids, such as paint, stain or varnish. As shown in FIG. 11, an optional liner 38 is inserted into the cavity for holding or transporting loose materials or fluids.

In an exemplary embodiment, hand-held vessel system 20 further includes a retainer for keeping a paintbrush or other tool within vessel 22, preferably raised from the floor of the cavity. In an embodiment, the retainer is at least one magnet 42 of retainer assembly 44, as illustrated in FIGS. 9A and 9B. Retainer assembly 44 includes a backer plate 46 that slides into recess 34 so that magnet 42 is held in opening 48 of inner wall 62, such that magnet 42 is exposed in the cavity of vessel 22. In another embodiment, magnet 42 is not necessarily exposed, but its magnetic force is active in the cavity of vessel 22 adjacent recess 34, such as through a thin layer of material. Backer plate 46 is larger in surface area than opening 48 so that the backer plate 46 does not fall through opening 48. Recess 34 includes ribs 50 to hold backer plate 46 and magnet 42 securely toward the inner surface 36 of vessel 22. In an exemplary embodiment, ribs 50 separate recess 34 into two central channels 80 and two side channels 78. When retainer assembly 44 is attached to vessel 22 as shown in FIGS. 1, 9A and 9B, magnet 42 is affixed in the cavity of vessel 22 adjacent to clip 30 of strap 24. A user can position a metallic ferrule portion of a tool such as paintbrush (not shown) against or proximate magnet 42, such as with the bristles of the paintbrush disposed inside the cavity of vessel 22, such that paint on the bristles drips into the cavity.

As shown in FIG. 11, a user can insert a disposable liner 38 in the cavity of system 20. An exemplary liner 38 is thin but relatively rigid, so that it does not deform in use, as a plastic film bag might. An exemplary liner 38 has contours that closely match those of inner surface 36 of vessel 22, so that use of liner 38 does not adversely affect the effective capacity of vessel 22. Moreover, a material of liner 38 suitably does not adversely affect the ability of magnet 42 to attract and retain a metallic tool portion, even when the liner 38 is interposed between the magnet 42 and the tool. Also visible in FIG. 11, in an exemplary embodiment, a bottom surface of liner 38 includes a raised central floor portion 51, which promotes pooling of fluid around a perimeter of the bottom of the cavity, thereby easing fluid disposition onto a tool inserted into the cavity of vessel 22 and liner 38. In an exemplary embodiment, features of system 20 are symmetrical about the center cross-sectional line 11-11 of FIG. 1.

Figure 5:
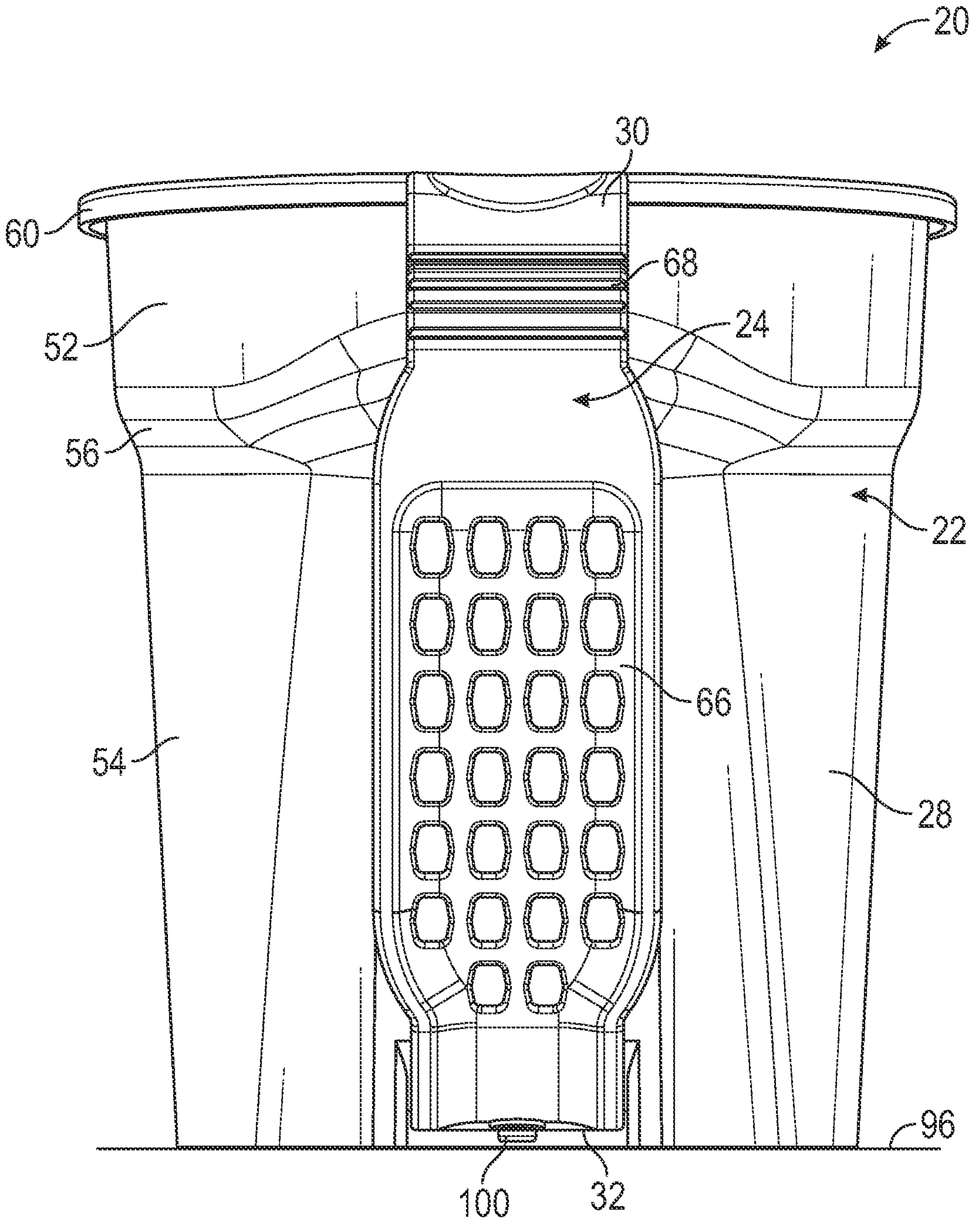
FIG. 5 is a rear elevation view of the exemplary vessel system.
Figure 6:
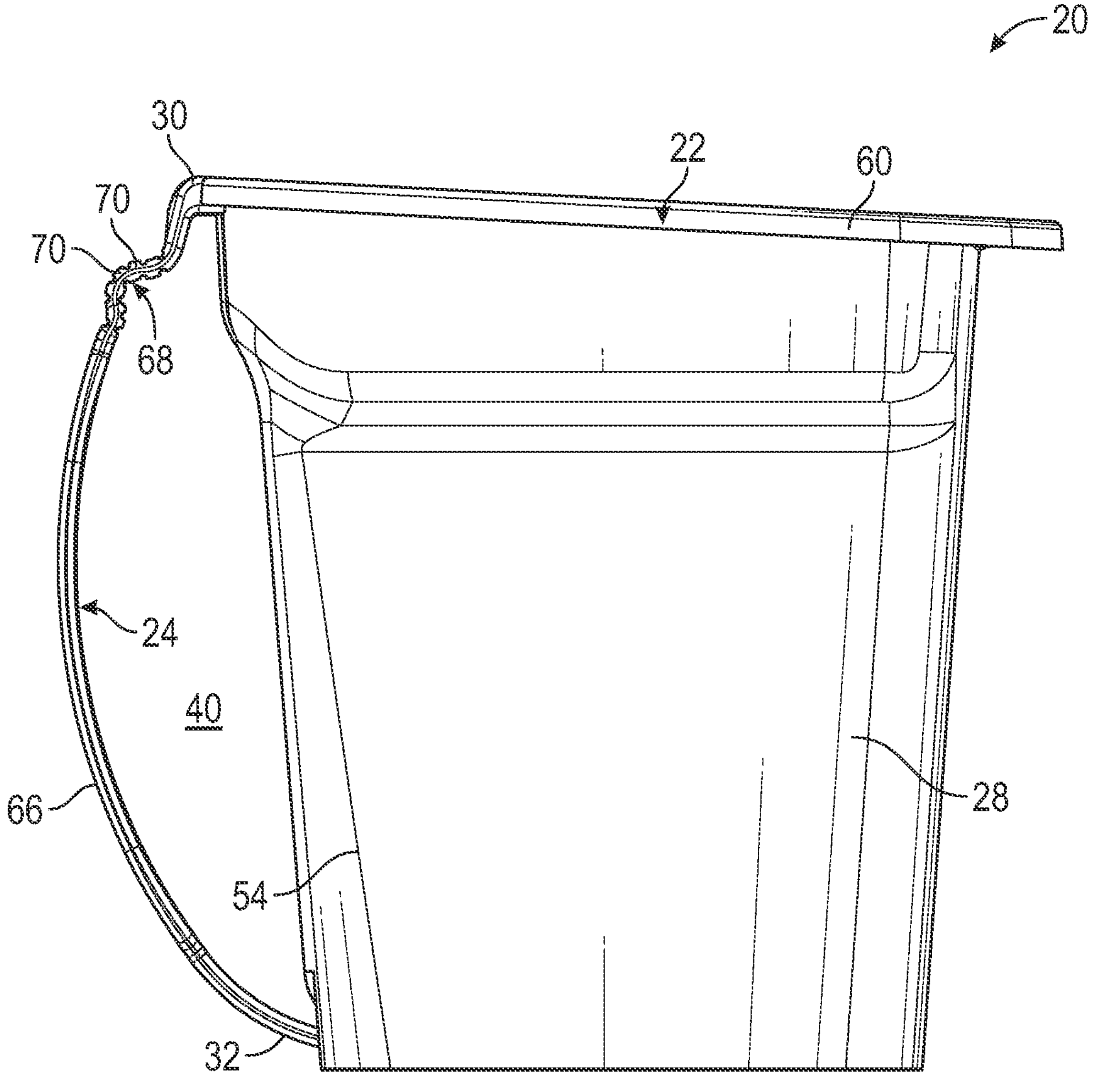
FIG. 6 is a side elevation view of the exemplary vessel system.
Figure 7:
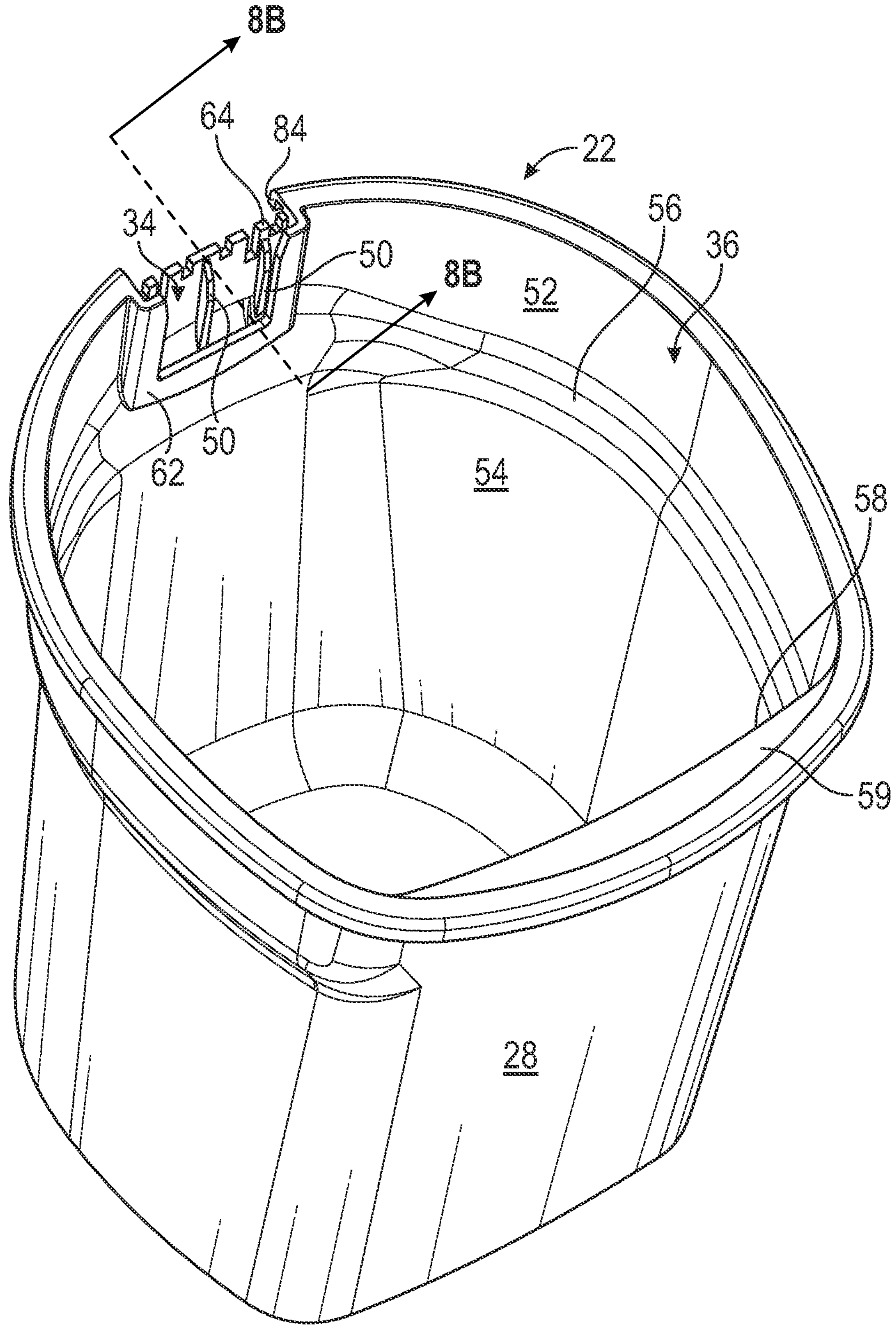
FIG. 7 is similar to FIG. 1 but shows the vessel without a hand strap or retainer assembly.
Figure 8A:
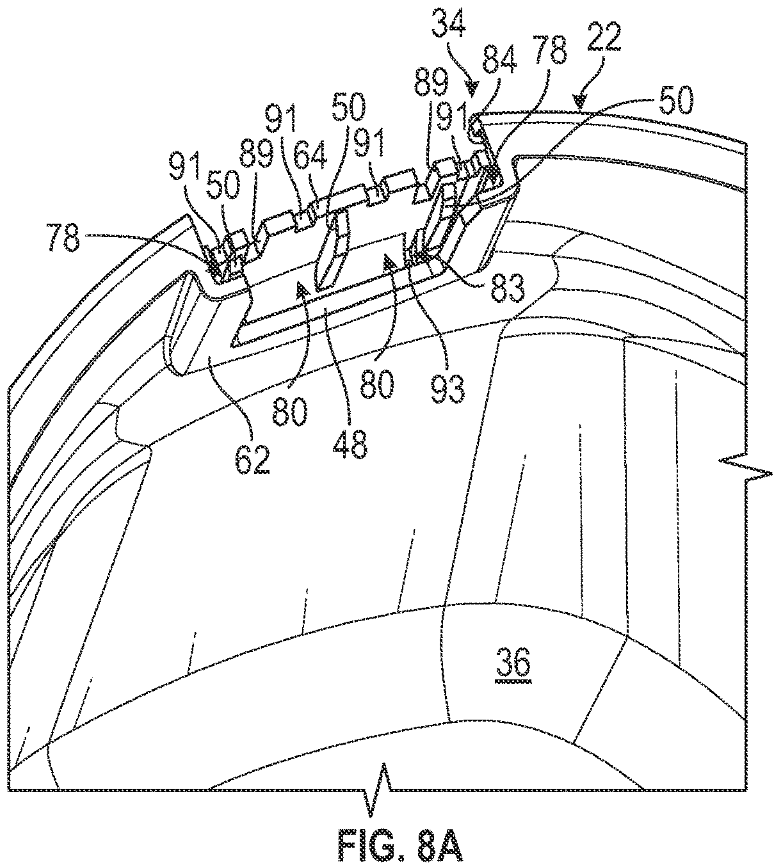
FIG. 8A is a partial enlarged view of a recess portion of FIG. 7.
Figure 8B:
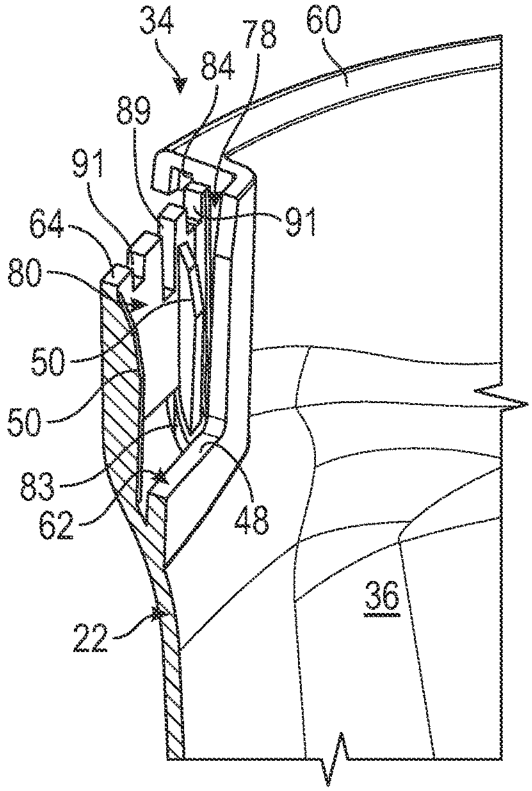
FIG. 8B is a cross-sectional view of the exemplary recess, taken along line 8B-8B of FIG. 7.
Figure 12:
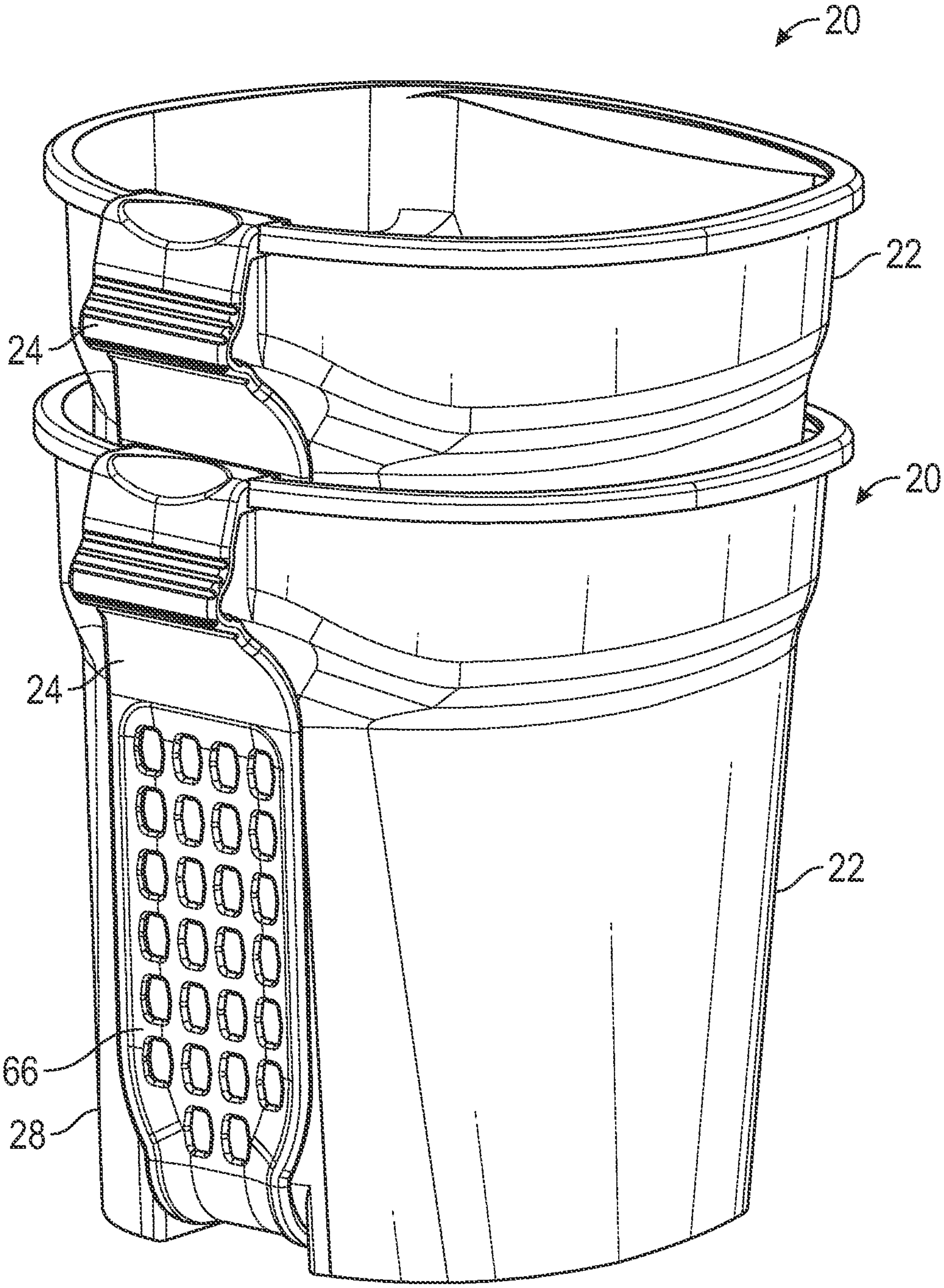
FIG. 12 is similar to FIG. 2 but shows two stacked exemplary vessel systems.

In an exemplary embodiment, some faces of sidewall 28 have an upper portion 52 and a lower portion 54 connected by intermediate portion 56. Lower portion 54 connects to bottom wall 26. As shown, upper portion 52 has a larger lateral cross-section dimension than the lower portion 54. Intermediate portion 56 is outwardly inclined at an angle with respect to lower portion 54. The larger cross-sectional dimension of upper portion 52 allows for easy access into the cavity of vessel 22 for insertion of a tool such as a paint brush or small paint roller. The relatively smaller cross-sectional dimension of lower portion 54 increases a depth of liquid at the bottom of vessel 22 for easy access by the tool. The inclined intermediate portion 56 allows fluid on an inner surface 36 of upper portion 52 to drip or slide down by gravity into lower portion 54. Moreover, as shown in FIGS. 5, 6 and 12, the overall angled orientations of sidewall 28 allow for nesting of multiple vessels 22 and systems 20, thereby providing for space savings in storage, transport or merchandise display. In an exemplary embodiment, sidewall 28 further includes a scraping lip 58 near a top rim 60 of vessel 22 opposite recess 34, though a scraping lip could be disposed anywhere on sidewall 28. In an exemplary embodiment, scraping lip 58 is configured as the corner edge of ledge 59 with no underhang; thus, the continuous inner surface 36 of vessel 22 is smooth and easy to clean. In an exemplary embodiment, rim 60 extends laterally and downwardly from sidewall 28 to form a lightweight, structurally strengthening top perimeter feature.

As shown in FIGS. 7-9B, a recess 34 is disposed proximate rim 60 to accommodate retainer assembly 44 and a portion of strap 24, such as clip 30. Recess 34 is defined by a space between inner wall 62 and outer wall 64. As discussed above, inner wall 62 includes opening 48 for magnet 42 of retainer assembly 44. Outer wall 64 is disposed opposite inner wall 62, includes ribs 50, and forms a part of the upper portion 52 of sidewall 28.

FIGS. 10A-10E illustrate an embodiment of strap 24 including clip 30 at a first end, lower vessel connection portion 32 at a second end, and intermediate portion 66 therebetween. An exemplary strap 24 includes hinge portion 68 between clip 30 and intermediate portion 66. Hinge portion 68 offers flexibility in the orientation of intermediate portion 66 relative to clip 30. For example, as shown in FIG. 6, hinge portion 68 is biased to retain intermediate portion 66 away from sidewall 28 so that passage 40 is maintained as an open channel through which a user's fingers or other object may pass. However, hinge portion 68 is flexible, so that intermediate portion 66 can be pressed toward sidewall 28 for space savings, such as in the nested configuration shown in FIG. 12. Closer nesting can also be accomplished with the lower vessel connection portion 32 of strap 24 detached from bottom wall 26. In an exemplary embodiment, hinge portion 68 is S-shaped while in a relaxed state, as illustrated in FIGS. 10B and 10C. When clip 30 is inserted downward into recess 34, the straightening of the top portion of the "S" results in a biasing of the remaining part of the hinge portion 68 away from upper portion 52 of sidewall 28. Further, in the illustrated embodiment, hinge portion 68 has ribs 70 connected by relatively thinner spans of material, thereby allowing hinge portion 68 to flex.

Figure 10E:
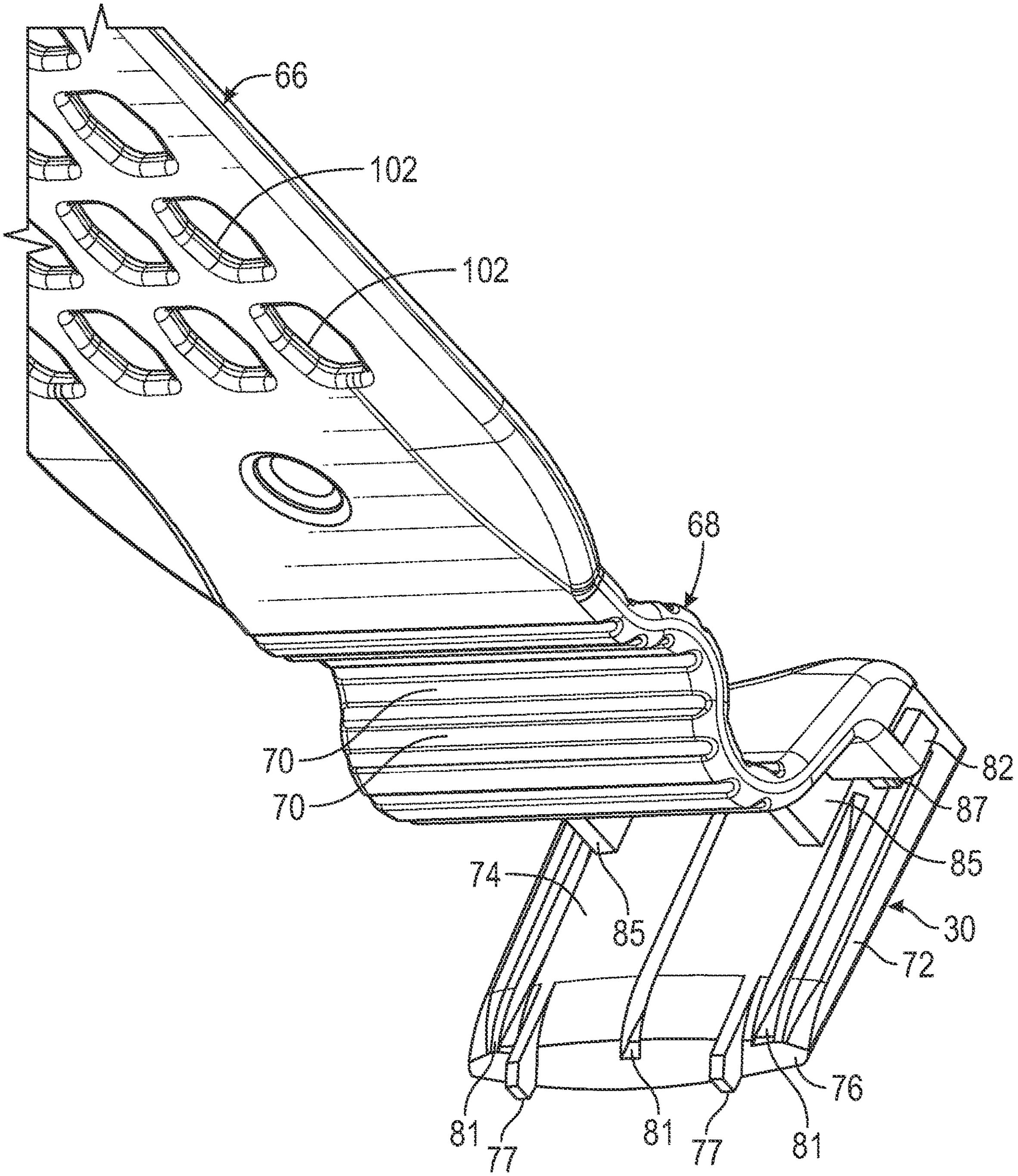
FIG. 10E is a partial underside perspective view of the exemplary hand strap showing a back of the clip.

In an exemplary embodiment, clip 30 includes clip plate 74 and a surrounding clip frame 72 configured for insertion into recess 34. An exemplary clip frame 72 has a tapered tip 76 for ease of insertion into recess 34. An exemplary clip 30 has a shoulder 79 at a transition between clip frame 72 and clip plate 74, the shoulder 79 configured to rest in contact with a perimeter edge of backer plate 46 in system 20 when vessel 22 is assembled with retainer assembly 44 and strap 24. Recesses 81 in clip plate 74 accommodate ribs 50 of recess 34. Prongs 77 extending from clip plate 74 are configured to fit into recesses 83 in outer wall 64 (shown in FIGS. 8A and 8B). In an exemplary embodiment, each recess 83 includes an aperture 93 at a bottom thereof to allow for the draining of any fluid that may enter recess 34. As shown in FIG. 10E, ribs 85 and 87 are configured to fit notches 89 and 91, respectively (labeled in FIGS. 4, and 8A to 9A). To mechanically lock strap 24 to vessel 22 when assembled together as system 20, clip 30 includes side protrusions 82, which are configured to snap into complementary pockets 84 in rim 60. Additionally, shoulder 79 of clip plate 74 snaps in place under backer plate 46. To present a smooth top surface at wall 62, an exemplary clip 30 includes a central protrusion 86 that is configured to fill a space above magnet 46 at opening 48. The verticals ribs and prongs 50, 77, 85, 87 fit into respective vertical notches and recesses 81, 83, 89, 91 thereby stabilizing against lateral disengagement forces. This mechanical interlocking system allows for assembly of vessel system 20 from the vessel 22, strap 24, and retainer assembly 44 without tools, other fasteners, or procedures requiring adhesives, heat, or other equipment. While particular locking structures are shown and described, it is contemplated that snap components or other locking structures can be provided elsewhere at the interfaces of vessel 22 and strap 24.

While FIGS. 10A-10E show strap 24 separate from vessel 22, in one process of assembly of system 20, strap 24 is actually formed while being affixed to the vessel 22. In this instance, strap 24 is overmolded into and onto vessel 22 so that chemical bonding, as well as mechanical engagement, hold the components of system 20 together at clip 30 and recess 34. In an exemplary manufacturing process, vessel 22 is molded from polypropylene at a first station. At a second station, retainer assembly 44 is automatically inserted into recess 34. Vessel 22 with the attached retainer assembly 44 is moved to a third station, where strap 24 is overmolded from a Thermoplastic Vulcanizate (TPV) such as Santoprene™ material, which is injected or otherwise disposed into recess 34. The Santoprene™ material fills recess 34 around retainer assembly 44 and is shaped by a mold outside of recess 34, thereby forming clip 30 and remainder of strap 24. A selection of chemically similar and/or compatible materials for vessel 22 and strap 24 facilitates their chemical bonding to each other. Because the Santoprene™ material of strap 24 contains polypropylene, clip 30 is chemically, as well as mechanically, bonded to the interior contours of recess 34 of a polypropylene vessel 22, In an exemplary manufacturing process, the Santoprene™ material for overmolding strap 24 is introduced to vessel 22 in a molten state at a third station.

The temperature to melt and injection mold the Santoprene™ material in to the mold cavity is great enough to ensure the bond between the strap 24 and the polypropylene vessel 22. This melt temperature remains fairly consistent during the injection molding process. In an exemplary manufacturing method, the Santoprene™ material for forming strap 24 has a process temperature (measured as the melted material temperature at the molding press injection nozzle) of about 380 degrees F. to about 440 degrees F. (about 193 C to about 227 C), although process temperatures outside this range may also be suitable. The bond between the elastomer (Santoprene™) strap 24 and the vessel 22 (polypropylene) is completed almost entirely in the time during the normal molding cycle of the strap 24 to the vessel 22. A majority of the cooling of the strap 24 occurs during the molding cycle (while the strap 24 is still held in the tool, before the mold opens). Some cooling, for approximately 5 to 10 minutes, still occurs after the mold cycle is complete before the system 20 (strap 24 and vessel 22) reaches room temperature. Another contributor to an increase in the bond strength between the strap 24 and the vessel 22 results from the normal stiffening of the materials as they cool to room temperature.

An exemplary clip 30 includes depression 88, which allows for a gap between the clip 30 and a tab 90 of liner 38 inserted into vessel 22, as shown in FIG. 11. Because liner 38 fits so closely to the contours of vessel 22, the gap between depression 88 and tab 90 allows a user to reach between the liner 38 and vessel 22 to easily mutually separate those parts when desired.

Figure 4:
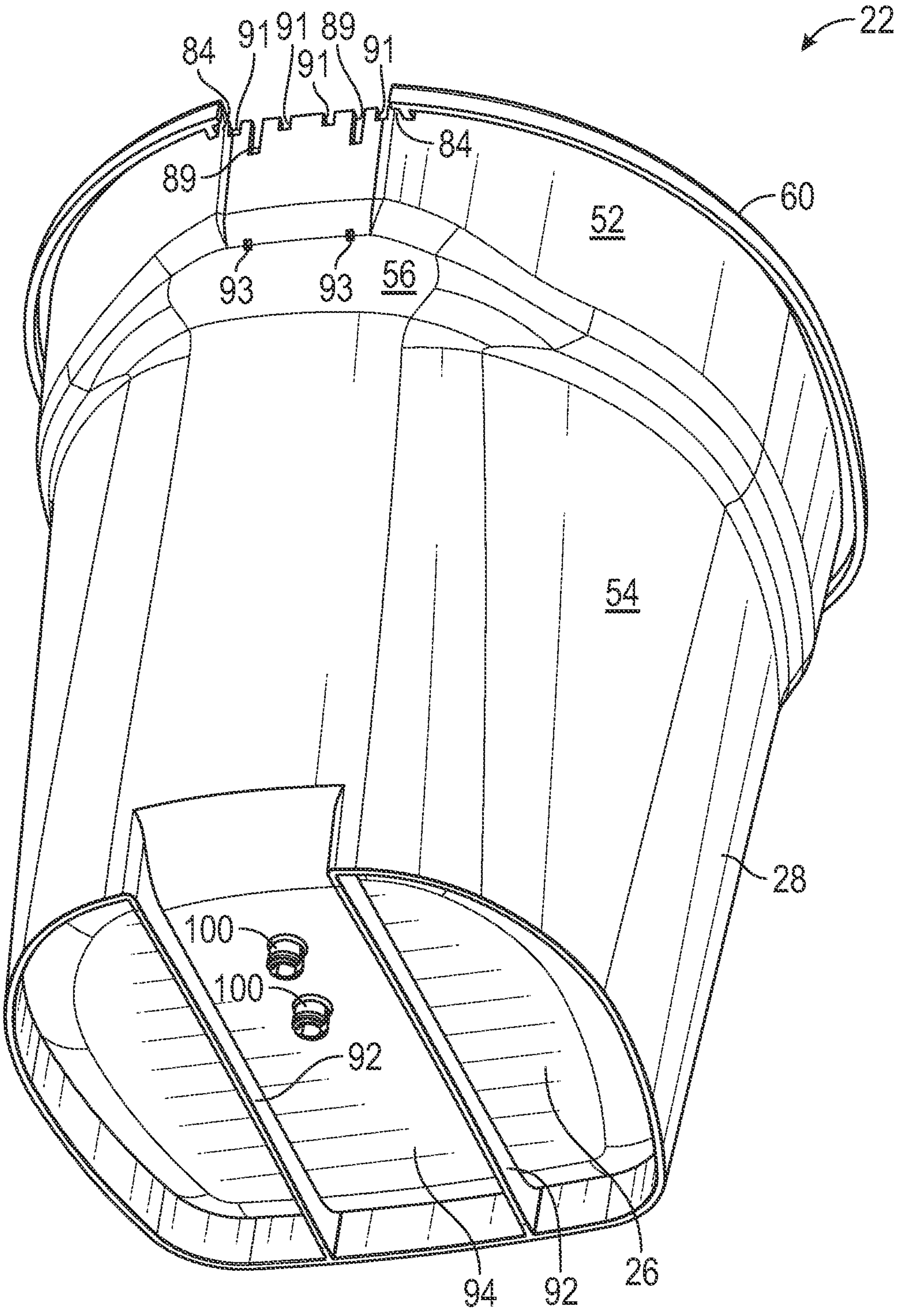
FIG. 4 is similar to FIG. 3 but shows the vessel without a hand strap.

As shown in FIGS. 3 and 4, lower vessel connection portion 32 of strap 24 is configured to be selectively secured to bottom wall 26 at discreet locations along the length of lower vessel connection portion 32. In an exemplary embodiment, flanges 92 extend from bottom wall 26 to at least define a channel 94 for receiving lower vessel connection portion 32 of strap 24 in a manner so that bottom wall 26 is stably raised from a surface 96 on which the system 20 is set, as labeled in FIG. 5.

As shown in FIGS. 10A and 10C, lower vessel connection portion 32 of strap 24 has at least one vessel engagement member 98. As shown in FIG. 4, bottom wall 26 has at least one strap engagement member 100. In an exemplary embodiment, vessel engagement member 98 is configured as a reinforced aperture (having a thicker perimeter than a surrounding area of lower vessel connection portion 32). In an exemplary embodiment, the aperture is shaped as a round hole extending entirely through a thickness of lower vessel connection portion 32 of strap 24. In an exemplary embodiment, strap engagement member 100 is configured as a raised set of semi-circular protrusions configured to frictionally fit snugly in vessel engagement member 98.

To attach lower vessel connection portion 32 of strap 24 to vessel 22, a set of two vessel engagement members 98 are positioned over the two strap engagement members 100 so that an effective length of strap 24 between the connection at clip 30 to vessel 22 and the connection at lower vessel connection portion 32 results in opening 40 of desired size. The user (or a robotic machine during manufacture of system 20) rolls or presses the lower vessel connection portion 32 of strap 24 against bottom wall 26 to frictionally insert each strap engagement member 100 into a corresponding vessel engagement member 98.

In an exemplary embodiment, the plurality of vessel engagement members 98 are closely spaced to offer a nearly continuous range of fit options. However, the corresponding strap engagement members are spaced apart for ease of use. In the example illustrated in FIG. 3, strap engagement members 100 are spaced to fit two non-adjacent vessel engagement members 98, so that an unengaged member 98 is positioned between the two members 98 that are attached to strap engagement members 100. In an exemplary embodiment, there are more vessel engagement members 98 than strap engagement members 100. The illustrated embodiment shows six vessel engagement members 98 and two strap engagement members 100, although the numbers provided can be different. The effective length of strap 24 (between the vessel connection points at clip 30 and engagement members 100) is thus adjustable among several predetermined lengths by aligning different selected vessel engagement members 98 with strap engagement members 100.

While a particular form of mutual fasteners 98, 100 is illustrated and described, it is contemplated that other snap or quick engagement structures can also or alternatively be used. Moreover, mutual fasteners can be provided at infinitely various locations along the length of the lower vessel connection portion 32 of the strap 24. Examples of two-part mechanical fasteners include (but are not limited to) hook and loop fasteners (such as Velcro™ fasteners) and headed stems (such as Dual Lock™ reclosable fasteners). Moreover, while the illustrated embodiments show connection of strap 24 to bottom wall 26, it is contemplated that a lower portion of strap 24 could be connected to a different location on vessel 22, such as on or near sidewall 28.

In an exemplary embodiment, strap 24 has flexibility and resilience characteristics to provide comfort to the user's hand by conforming to the shape of the hand. Strap 24 is resiliently deformable relative to vessel 22, and thus is capable of accommodating a variety of hand sizes and shapes. In exemplary embodiments, strap 24 is made of a low durometer Thermoplastic Elastomer (TPE), Thermoplastic Vulcanizate (TPV) such as Santoprene™ material, rubber, or other flexible material. In addition, in exemplary embodiments, strap 24 is widened along intermediate portion 66 compared to hinge portion 68 and lower vessel connection portion 32 to disperse the pressure exerted by the strap 24 on the hand over a larger area of the hand. Strap 24 could assume a variety of shapes other than the illustrated shape. In an exemplary embodiment, a plurality of ventilation apertures 102 are provided through intermediate portion 66 to increase comfort and decrease weight. In the illustrated embodiments, ventilation apertures 102 are shaped as holes extending entirely through a thickness of intermediate portion 66 of strap 24. Moreover, as shown in FIG. 12, the flexible nature of strap 24 allows the strap 24 to bend and fit into the cavity of another system 20 for stacking.

The described system 20 provides a convenient, stable, secure and effortless way to hold a vessel. In an exemplary method of use, the user inserts his or her fingers into passageway 40 with the palm facing and contacting sidewall 28, with the back of the hand contacting strap 24, allowing the thumb to rest comfortably in or near depression 88. In an exemplary embodiment, system 20 is substantially symmetrical along line 11-11 of FIG. 1; therefore, system 20 easily accommodates either a left hand or right hand. The user does not need to grip strap 24 or sidewall 28 of vessel 22 because strap 24 holds the user's hand against outer surface of sidewall 28, The user can grip sidewall 28 or can merely relax his or her hand during use of the vessel, knowing that vessel 22 is securely fastened to that hand by strap 24. Thus, the system 20 greatly reduces fatigue in the holding hand and fingers of a user, compared to conventional paint containers, which must be affirmatively gripped.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa. All references mentioned in this disclosure are hereby incorporated by reference.

The invention claimed is:

1. A vessel system comprising:
- a vessel having an outside surface and comprising:
  - a bottom wall;
  - a sidewall extending from the bottom wall;
  - an inner wall connected to the sidewall inward of the outside surface, wherein a recess is defined between the sidewall and the inner wall; and
  - a rim at an end of the sidewall opposite the bottom wall, wherein the rim extends outwardly and downwardly from the sidewall to define a pocket proximate the recess; and
  - a strap comprising a protrusion configured to fit in the pocket.

2. The vessel system of claim 1 comprising:
- a retainer assembly comprising:
  - a magnet, wherein the inner wall comprises an opening configured to at least partially surround the magnet; and
  - a backer plate that has a larger surface area than the opening.

3. The vessel system of claim 2, wherein the retainer assembly is disposed in the recess.

4. A vessel system comprising:
- a vessel having an outside surface and comprising:
  - a bottom wall;
  - a sidewall extending from the bottom wall;
  - an inner wall connected to the sidewall inward of the outside surface, wherein a recess is defined between the sidewall and inner wall; and
  - a retainer assembly received in the recess, wherein the retainer assembly comprises a magnet;
  - wherein the inner wall comprises an opening configured to at least partially surround the magnet.

5. The vessel system of claim 4, wherein the retainer assembly comprises a backer plate that has a larger surface area than the opening.

6. The vessel system of claim 4, wherein a strap is configured for selective attachment to the outside surface.

7. The vessel system of claim 4 comprising a strap having opposed first and second ends, wherein the first end is received in the recess.

8. A vessel system comprising:
- a vessel having an outside surface and comprising:
  - a bottom wall;
  - a sidewall extending from the bottom wall; and
  - an inner wall connected to the sidewall inward of the outside surface, wherein a recess is defined between the sidewall and inner wall; and
  - a plurality of ribs extending from the sidewall or from the inner wall within the recess; and
- a strap having opposed first and second ends;
- wherein:
  - a central channel of the recess is defined by two of the plurality of ribs and a first portion of the sidewall;

a side channel of the recess is defined by a portion of the inner wall, one of the plurality of ribs, and a second portion of the sidewall; and the first end of the strap is received in the central channel and the side channel of the recess.

9. The vessel system of claim 8, wherein the second end of the strap is configured for selective attachment to the outside surface.

10. The vessel system of claim 8, comprising a retainer assembly comprising a magnet.

11. The vessel system of claim 10, wherein the retainer assembly comprises a backer plate.

12. The vessel system of claim 11, wherein the backer plate is configured to fit between at least one of the plurality of ribs and the inner wall.

13. The vessel system of claim 8, wherein the first end of the strap comprises a clip plate configured to fit into the recess.

14. The vessel system of claim 13, wherein the first end of the strap comprises a clip frame surrounding the clip plate.

15. The vessel system of claim 14, wherein the clip frame is configured to fit into the recess.

16. The vessel system of claim 13, wherein the clip plate includes a plurality of plate recesses configured to engage the plurality of ribs.

17. The vessel system of claim 13, wherein the clip plate includes a tapered end.

18. The vessel system of claim 13, wherein the clip plate includes a shoulder configured to contact a perimeter edge of a backer plate of the retainer assembly.

* * * * *